United States Patent [19]
Landin

[11] Patent Number: 6,153,674
[45] Date of Patent: Nov. 28, 2000

[54] FIRE BARRIER MATERIAL

[75] Inventor: Heather V. Landin, Baldwin, Wis.

[73] Assignee: 3M Innovative Properties Company, St. Paul, Minn.

[21] Appl. No.: 09/016,876

[22] Filed: Jan. 30, 1998

[51] Int. Cl.$^7$ .............................. C09K 21/14; C08K 3/38
[52] U.S. Cl. ........................... 524/35; 523/179; 524/404; 524/416; 524/423; 524/436; 524/437; 524/494; 524/524; 524/495
[58] Field of Search ................................ 523/179; 524/35, 524/404, 416, 423, 436, 437, 494, 495

[56] References Cited

U.S. PATENT DOCUMENTS

| | | | |
|---|---|---|---|
| 1,137,373 | 4/1915 | Aylsworth . | |
| 3,084,172 | 4/1963 | Larsen | 260/348 |
| 3,294,702 | 12/1966 | Larsen | 252/316 |
| 3,323,869 | 6/1967 | Olstowski | 23/209.1 |
| 3,574,644 | 4/1971 | Olstowski | 106/15 |
| 3,916,057 | 10/1975 | Hatch | 428/236 |
| 4,255,318 | 3/1981 | Kaide et al. | 260/42.18 |
| 4,273,821 | 6/1981 | Pedlow | 428/215 |
| 4,273,879 | 6/1981 | Langer et al. | 521/91 |
| 4,277,532 | 7/1981 | Czepel et al. | 428/244 |
| 4,305,992 | 12/1981 | Langer et al. | 428/324 |
| 4,443,517 | 4/1984 | Shah | 428/281 |
| 4,454,190 | 6/1984 | Katagiri | 428/281 |
| 4,600,634 | 7/1986 | Langer | 428/220 |
| 4,945,015 | 7/1990 | Milner et al. | 523/179 |
| 5,110,413 | 5/1992 | Steer | 162/145 |
| 5,176,794 | 1/1993 | Conner et al. | 162/123 |
| 5,232,976 | 8/1993 | Horacek et al. | 524/495 |
| 5,258,216 | 11/1993 | von Bonin et al. | 428/102 |
| 5,340,643 | 8/1994 | Ou et al. | 428/283 |
| 5,384,188 | 1/1995 | Lebold et al. | 428/283 |
| 5,482,686 | 1/1996 | Lebold et al. | 422/179 |
| 5,498,466 | 3/1996 | Navarro et al. | 428/408 |
| 5,595,817 | 1/1997 | Schafer et al. | 428/283 |
| 5,830,319 | 11/1998 | Landin | 162/159 |

FOREIGN PATENT DOCUMENTS

| | | |
|---|---|---|
| 1 058 455 | 7/1979 | Canada . |
| 1 151 519 | 8/1983 | Canada . |
| 0 452 567 A1 | 4/1990 | European Pat. Off. .......... C08K 3/04 |
| 0 508 751 A2 | 10/1992 | European Pat. Off. . |
| 0 671 452 A2 | 1/1995 | European Pat. Off. . |
| 0 687 555 | 2/1995 | European Pat. Off. ........ B32B 19/06 |
| 0 725 458 A1 | 1/1997 | European Pat. Off. . |
| 35 36 371 C2 | 5/1987 | Germany . |
| 36 25 080 A1 | 1/1988 | Germany . |
| 41 35 678 A1 | 5/1993 | Germany . |
| 43 25 966 A1 | 2/1995 | Germany . |
| 2-206649 | 8/1990 | Japan . |
| 2-253936 | 10/1990 | Japan . |
| 2516556 | 2/1991 | Japan . |
| 6-240179 | 8/1994 | Japan . |
| 8-67771 | 3/1996 | Japan . |
| 8-85189 | 4/1996 | Japan . |
| 8-143715 | 6/1996 | Japan . |
| 2619818 | 9/1997 | Japan . |
| 1 497 118 | 1/1978 | United Kingdom . |
| 2 271 362 | 4/1994 | United Kingdom . |
| WO 91/11498 | 8/1991 | WIPO . |
| WO 92/19799 | 11/1992 | WIPO .............................. D01F 6/36 |
| WO 94/21748 | 9/1994 | WIPO ........................... C09K 21/02 |

OTHER PUBLICATIONS

"HSS2000 Hot Smoke Seal", Pemko Manufacturing, Jul. 9, 1997.

*Primary Examiner*—Kriellion Sanders
*Attorney, Agent, or Firm*—David B. Patchett

[57] ABSTRACT

A flexible self-supporting fire barrier material comprising about 0.5 to about 25 weight % of a structural phase and greater than or equal to about 75 weight % to about 99.5 of inorganic heat absorbing compounds dispersed throughout the structural phase, based on a total weight % of the fire barrier material; the structural phase comprising 0.5 to about 10 weight % binder and 0.01 to about 15 weight % fibers, based on the total weight % of the fire barrier material; the inorganic heat absorbing compounds comprising an intumescent compound and an endothermic compound; the material having a density of at least about 0.5 g/cc.

17 Claims, No Drawings

FIRE BARRIER MATERIAL

FIELD OF THE INVENTION

This invention relates to a fire barrier material which, in the unfired state, allows dissipation of heat and which deters the spread of flames, smoke, vapors and/or heat during a fire.

BACKGROUND OF THE INVENTION

Materials used to reduce or eliminate the passage of smoke and flames through openings between walls and floors and the openings caused by through penetrations in buildings are known as fire stop, fire retardant, or fire barrier materials.

Intumescent sheets, caulks, putties, and coatings are known for use in various fire retardant or fire barrier applications. Many of these materials have a high organic content. In particular, intumescent compounds have been used with polymeric binders to form caulks for use in filling joints. Elastomeric sheets containing intumescent compounds are also known for use in pipe wraps or cable tray wraps.

Intumescent sheets which additionally contain a large inorganic component based on kaolinitic clay and other colloidal cementaceous materials typical of papermaking are also known. These clays and colloidal materials are considered to be inorganic binders by their nature. Characteristically, these binders results in stiff boardy articles which, like paper, must be formed in very thin layers to demonstrate any useful flexibility.

Non-intumescent non-char forming endothermic flexible sheet materials are also known which are essentially inorganic and are suitable for use in areas where electrical systems and sensitive equipment need fire protection. This type of sheet can have relatively high thermal conductivity in its unfired state.

In addition, compositions containing inorganic endothermic materials, such as sodium silicates, and intumescent materials in a free standing article in a sufficient quantity to provide swelling of a functional magnitude are known. Yet, in these compositions, typically, the remainder of the composition tends to consist largely of structural materials in the form of organic polymer combined with char forming additives, fibers, or stiff colloidal materials. Within another group of compositions with similar intumescent properties the remainder of the composition also typically consists of structural materials, but these compositions contain large amounts of fibers.

Thus, the industry is always seeking better and more effective materials. It is desired to provide a durable, freestanding, significantly intumescent heat absorptive fire barrier composition having a low combustible load and a high unfired density for low thermal resistance that will allow the useful dissipation of heat at room temperature. Such a material being especially useful in providing fire protection for electrical systems and sensitive electrical and mechanical equipment and generally useful as a non-combustible fire barrier which delivers a high heat absorptive value when used in small volumes. Such compositions would not depend on an organic char for their structural integrity in the fired state and would be especially useful in high temperature fires such as chemical fires or electric fires where organic chars are rapidly reduced to carbonaceous gases as well as in applications, for example, protecting electrical equipment and cables, where it is desirable to allow heat dissipation during normal operation and where inorganic fiber insulation is not useful. These compositions would be dense enough to provide, in relatively small amounts, the protection associated with substantial heat absorbing effects without a corresponding reduction in thermal conductivity of the system in the unfired state.

SUMMARY OF THE INVENTION

The present invention provides a fire barrier which minimizes exothermic reactions during firing and allows the maximum possible amount of endothermic contribution while additionally providing an intumescent component to supply the degree of volumetric expansion or of expansion force required for various applications. In addition, the material is dense and flexible. These characteristics allow effective protection against the transfer of heat for significant periods of time in small openings, for example, at doors and window edges which may ordinarily be hard to protect using a minimal amount of material.

The present invention relates to a flexible self-supporting fire barrier material comprising about 0.5 to about 25 weight % of a structural phase and greater than or equal to about 75 weight % to about 99.5 of inorganic heat absorbing compounds dispersed throughout the structural phase, based on a total weight % of the fire barrier material; the structural phase comprising about 0.5 to about 10 weight % binder and 0.01 to about 15 weight % fibers, based on the total weight % of the fire barrier material; the inorganic heat absorbing compounds comprising an intumescent compound and an endothermic compound; the material having a density of at least about 0.5 g/cc.

DETAILED DESCRIPTION OF THE INVENTION

For the purpose of this invention, the following terms are used herein:

"binder" refers to an organic polymeric material;

"cellulosic fibers" refers to fibers of carbohydrate polymers typically derived from wood or cotton and are a species of organic fibers;

"endothermic compound" refers to a compound that absorbs heat, typically by releasing water of hydration, by going through a phase change that absorbs heat (i.e. liquid to gas), or by other chemical change where the reaction requires a net absorption of heat to take place;

"to fire" refers to the chemical and/or mechanical changes accompanying exposure to heat of a fire or a flame;

"flexible" refers to the drapability of the sheet; a flexible sheet is one that can be fitted into a construction joint and subjected to building movement (seismic, thermal, wind sway, etc.) or wrapped around a structural element of a building, for example, without breaking or significantly cracking;

"heat absorbing compound" refers to a compound that reacts to create an insulating barrier and includes endothermic and intumescent compounds and absorbs heat due to a phase change or rearrangement of chemical bonds activated within the caloric contribution and temperature ranges defined by a typical fire test such as ASTM E119 "Fire Tests of Building Construction and Materials" or ASTM E1529 "Determining the Effects of Large Hydrocarbon Pool Fires on Structural Members and Assemblies";

"intumescent compound" refers to a compound that expands to at least about 1.5 times its original volume upon heating at a temperature, typically above about 100° C.;

"inorganic fibers" refer to mineral wool, silicate glass, glass-ceramic, or ceramic, refractory, aluminate, or fiberous crystal mineral materials in the form of fibers;

"organic fibers" refer to natural or synthetic polymeric materials having pendant hydroxyl groups, such as cellulosic materials, in the form of fibers;

"rayon fiber" refers to an extruded cellulosic material in the form of fibers;

"self-supporting" means that fire barrier material has sufficient cohesive strength to support its own weight; and "structural phase" means materials in combination that provide the cohesive and structurally supportive properties of the composition and which allow it to be formed into a self-supporting flexible sheet or a free standing article.

A flexible self-supporting fire barrier material in accordance with the present invention comprises about 0.5 to about 25 weight % of a structural phase and greater than or equal to about 75 weight % to about 99.5 of inorganic heat absorbing compounds dispersed throughout the structural phase, based on a total weight % of the fire barrier material.

Structural Phase

The structural phase comprises about 0.5 to about 10 weight % binder, preferably 3 weight % to about 9 weight % binder, and about 0.01 to about 15 weight % fibers, preferably 3 weight % to about 10 weight % fibers, based on the total weight % of the fire barrier material.

Binder

Binders used in the present invention comprise a polymeric material and may be in the form of aqueous emulsions (also referred to as "lattices"), aqueous solutions, non-aqueous solutions, or organosols. The term "solution" refers to polymeric materials dissolved in a liquid media, such as water or an organic liquid such as acetone or toluene. Suitable binders may include polymeric materials which may be either thermoplastic or thermosetting. Preferably the binder has elastomeric properties, i.e., rubber-like properties, such as conformability and stretch.

"Thermoplastic" materials typically have long polymer chains with few, if any, chemical bonds acting to crosslink the chains. Thermoplastic materials, when heated, normally become soft and moldable and return to their original condition when cooled. Subsequent reheating serves to resoften the material. Examples of thermoplastic materials include substantially linear polymers such as acrylate polymers, natural rubbers, polychloroprene, styrene butadiene copolymers, butadiene acrylonitrile copolymers, polyisoprene, polybutadiene, polyvinyl chloride, polyvinyl acetate, polyethylene terephthalate, polyethylene, polypropylene, polystyrene, and combinations and mixtures of these polymers. The term "substantially linear" as used with reference to these materials refers to a preference for no more than three or four branches on average per polymer chain, preferably one or two, and most preferably zero.

"Thermoset" materials refer to polymers which undergo crosslinking reactions and thus cure or "set", typically upon heating. If the crosslinking is sufficiently high, the material tends to be hard, infusible, and insoluble. Such materials typically cannot be subsequently permanently changed if warmed. Two or more liquid components can be reacted to form a thermoset polymer; for example, a multifunctional amine and a multifunctional epoxy may be reacted to form an epoxy system. Examples of suitable thermoset materials include epoxies, polyurethanes, polyimides and the like. In addition, suitable thermoset materials include thermoplastic materials capable of being crosslinked with the addition of a crosslinking agent, for example, natural rubber, polychloroprene, styrene butadiene copolymers, butadiene acrylonitrile copolymers, and polybutadiene.

Preferably, the binder is in the form of a latex, i.e., a colloidal suspension of polymer in water which can be coagulated or precipitated out of suspension by an abrupt pH change or other event causing ionic charge disruption of the colloidal structure. More preferably, the latex enhances both flame-retardance of the fire barrier material. Suitable lattices include halogenated and non-halogenated lattices. Typically, these lattices are commercially available as an aqueous dispersion. Suitable polymers include, for example, acrylate and methacrylate polymers and copolymers, polybutadiene and polybutadiene acrylate, natural rubbers, styrene butadiene copolymers, butadiene acrylonitrile copolymers, urethane elastomers, polyvinylidene fluoride, silicone, polyamide, polyisoprene, polychloroprene, and polybutadiene. Preferred latex binders include an acrylate polymer, which is commercially available under the trade designation "RHOPLEX HA-8" from Rohm and Haas Co. of Philadelphia, Pa., and an ethylene/vinyl acetate/acrylate terpolymer, which is commercially available under the trade designation "AIRFLEX 600BP" from Air Products and Chemicals, Inc. of Allentown, Pa.

It is preferred to use halogen-free polymers to avoid decomposition and release of noxious and corrosive halogen gases during a fire, especially around sensitive electrical equipment. Acrylic polymers are preferred because of their aging properties, and non-corrosive combustion products. Polymers with elastomeric properties at room temperature are preferred. The polymer can have rubber-like properties, such as conformability and stretch.

If the binder comprises a halogenated polymer and the halogen is present in sufficient quantity, the binder typically has flame retardant properties, and no additional flame retardant need be added to the mixture making up the fire barrier material. When the binder has no inherent flame-retardant properties, a flame retardant preferably is added.

As known to those of skill in the art, many methods may be used to determine the flame-retardant properties of a material. A semi-quantitative test method can be used to evaluate the ignitability and burning behavior of different polymers, i.e. the "limiting oxygen index". This test relatively measures flame-retardant properties by measuring the minimum concentration of oxygen in an oxygen-nitrogen atmosphere that is necessary to initiate and support a flame for $\geq 3$ minutes. The higher the ignitability, the higher the oxygen indexes number. This test is described in ASTM standard D2863, "Standard Test Method for Measuring the Minimum Oxygen Concentration to Support Candle-like Combustion of Plastics (Oxygen Index)". When the fire barrier material of this invention comprises binders having a limiting oxygen index of greater than about 25 (which generally include halogenated polymers), an additional flame retardant is generally not required.

The amount of binder typically ranges from about 0.5 to about 10 weight %, preferably from 3 weight % to 9 weight percent, based on the total weight of the fire barrier material.

Fiber

Fibers are included in the present invention to strengthen the material, provide structural integrity, and improve the flexibility of the material. The fibers also contribute to the structural integrity of the fired material after exposure to heat.

Suitable fibers include organic fibers comprising an organic material having pendant hydroxyl groups and inorganic fibers. The amount of fibers typically ranges from about 0.01 to about 15 weight %, preferably from 3 weight % to 10 weight percent, based on the total weight of the fire barrier material.

Organic fiber amounts of, for example, 1 to 4 weight % of the total weight of the material, can impart a large improvement to the durability of the resulting article. Organic fibers are often more durable in that they are "tougher" than inorganic fibers and have a higher work to failure. Also, organic components usually tolerate repeated flexure/extension better because they are often ductile rather than brittle.

Examples of organic fibers include cellulosic fibers, synthetic polymeric fibers such as nylon, thermoplastic and polyester fibers. Examples of inorganic fibers include glass fibers, glass ceramic fibers, ceramic fibers, mineral fibers, metal fibers, and carbon fibers.

Suitable cellulosic fibers include cotton, flax, hemp, jute, rice, wheat, bamboo, corn, sisal, ramie, kenaf, rayon, burlap, shoddy cotton, cotton linters, and pulp fibers. Preferred cellulosic fibers include rayon fibers commercially available under the trade designations "RAYON 3D ½" and "RAYON 3D ¼" from MiniFiber, Inc. of Johnson City, Tenn., which are provided as chopped fibers in 1.25 cm and 0.63 cm lengths, respectively. The "D" designation refers to the denier of the fiber. Preferred cellulosic fibers also include wood fibers. Wood pulp fibers can be obtained from well known chemical processes such as the kraft and sulfite processes as well as from mechanical pulp processes. Suitable starting materials for these processes include hardwood and softwood species, such as alder, pine, Douglas fir, spruce, and hemlock. Preferred wood fibers are commercially available from Conwed Fibers of Conover, N.C., and comprise pine and poplar fibers.

Suitable synthetic polymeric fibers include viscose rayon, cellulose diacetate, and cellulose triacetate.

Suitable inorganic fibers include fiberglass, ceramic fibers such as aluminosilicate refractory fibers, aluminate fibers graphite, silica, alumina-silica, alumina, calcium oxide-silica, asbestos, metal fibers, and glass fibers. Preferred alumino-silicate fibers are available commercially from the Carborundum Company, Niagra Falls, N.Y., under the trade designation "FIBERFRAX" or from Babcock and Wilcox, under the trade designation "Kaowool". Preferred glass fibers are commercially available from Shuller International, Defiance, Ohio, under the trade designation "MICROFIBER 106/475". Other suitable fibers are commercially available from Minnesota Mining and Manufacturing Company (3M), St. Paul, Minn., under the trade designation "Nextel".

Any of the organic fibers as well as any of the inorganic fibers may be used alone or in combination with other fibers; preferably, organic and inorganic fibers are combined. Preferred fibers for the present invention include a combination of inorganic fibers comprising aluminosilicate fibers and fiberglass. Inclusion of fiberglass as a portion of the fiber component can contribute to allowing the fire barrier material of the present invention to fuse to some degree during firing, for example, under ASTM E119 test criteria, thus enhancing the cohesiveness and durability of the fired sheet.

The addition of fine glass frit has a similar effect. The use of fiberglass is preferable since the fibers contribute to the structural integrity of the composition and glass frit as additional filler does not.

Fibers suitable for the present invention typically come in bales or loose chop and can be separated by strong shearing action during the process of making a fire barrier material of the present invention.

Fibers useful in the present invention typically have a diameter and length which maximizes bulk entanglement, while making a smooth coagulum for delivery to a screen, in the process for preparing a fire barrier material in accordance with the present invention. Suitable fibers impart enhanced flexibility and tensile strength to the fire barrier material of the present invention. For example, typical suitable fibers have a diameter of about 0.05 microns to about 20 microns, preferably 0.1 micron to 12 microns, maximizing the bulk entanglement while maintaining a smooth coagulum for delivery to the screen in the process for preparing the material described below.

Typically, organic fibers useful in this invention have a diameter of about 1 to about 20 microns, preferably about 5 to about 12 microns and typically an average length ranging from about 3 to about 25 mm, more typically, from about 6 to about 13 mm. The organic fibers useful in the present invention are preferably rayon or another form of cellulose that can be obtained as extremely fine fibers, for example, with a diameter of 20 microns or less and a length ranging from about 3 mm to about 13 mm.

Typically, inorganic fibers useful in this invention have a diameter of about 0.05 to about 5 microns, preferably from about 0.1 to about 1 micron, and typically an average length ranging from about 1 to about 25 mm and more typically from about 3 to about 10 mm.

Inorganic Heat Absorbing Compounds

Inorganic heat absorbing compounds are dispersed within the structural phase of the fire barrier material of the present invention and comprise an intumescent compound and an endothermic compound. The amount of heat absorbing compounds ranges from about 75% by weight to about 99.5% weight based on the total weight of the fire barrier material.

Intumescent Compounds

During heating, an intumescent compound will expand, by physical force, the fire barrier material of the present invention and may generate gas. Typically this occurs at a temperature above about 100° C. Increasing intumescence generally correlates with increasing the actual particle size of the intumescent material. This is a consideration in attempting to choose particles of optimally small size to be useful in this invention. These considerations influence the choice of intumescent compound useful in generating a desired change in volume.

An intumescent compound contributes to the insulating ability of a fire barrier material by increasing the total volume of the fire barrier material and creating a generally tight seal around or between construction elements or other objects to be protected from heat. This volume change will make the material more thermally insulating than it was in its originally unfired state. Additionally, endothermic absorption of some thermal energy during this expansion contributes to the overall inhibition of thermal transfer during firing.

As stated above, an intumescent compound is one that expands to at least about 1.5 times its original volume upon heating. The intumescent compound provides for expansion of the fire barrier material of the present invention, in an unconfined state, to at least about 1.5 times the original thickness of the material according to the Thickness Expansion Test described below, preferably at least about three times its original thickness, more preferably, four times its original thickness. For some uses, it is preferable that the fire barrier material expand to at least about nine times its original thickness.

Typical intumescent compounds are varied in chemical composition but are recognized by the property of swelling, foaming or otherwise increasing in size as the result of a chemical change resulting in a physical change within the structure of the individual particles of intumescent material. This change is activated by an increase in temperature (i.e., energy or heat). This differentiates them from a blowing agent, which typically is a material that reacts to generate a gas within a surrounding liquid to create a foamed matrix.

Suitable intumescent compounds are substantially insoluble in water. That is, preferably, they do not exhibit more than about 5 weight % solubility at about 25° C. and, more preferably, not more than about 10 weight % solubility at about 50° C. As used herein all solubility percentages are weight percentages based on the weight of the material (fully hydrated if the molecules contain water of hydration) and the total weight of the solution.

Exemplary intumescent compounds include intumescent graphite such as intercalated graphite and acid treated graphite, hydrated alkali metal silicates, vermiculite, perlite, NaBSi, volcanic glass with $CO_2$ blowing agent incorporated within the glass particles, mica, and mixtures thereof.

Preferred intumescent graphite materials include acid intercalated graphite having an acid-neutralized surface commercially available under the trade name "GRAPHITE TG373" and "GRAPHITE IG-338-50", both from UCAR Carbon of Cleveland, Ohio. Another preferred intumescent compound is a granular hydrated alkali metal silicate intumescent composition commercially available under the trade designation "EXPANTROL 4BW" from the 3M Company of St. Paul, Minn.

An intumescent compound is present at least in an amount sufficient to prevent the fire barrier material from shrinking when it is heated. Typically, the intumescent compound is present in an amount ranging from at least about 5 weight %, preferably about 5 weight % to about 85 weight %, more preferably 9 weight % to about 75 weight %, based on the total weight % of the fire barrier material. The nature of the intumescent properties and the density of the compound are critical in determining the actual percentage useful in the final composition. For example, vermiculite is very dense and has limited intumescence. Granular hydrated alkali metal silicate intumescent compound commercially available from Minnesota Mining and Manufacturing Company (3M), St. Paul, Minn., under the trade designation "EXPANTROL 4BW" is very dense but has good intumescent properties. Intumescent graphite has excellent intumescent properties and relatively low density compared with the previous two materials. The weight ratio of intumescent compound to total composition needed to obtain useful intumescent properties in the final composition would obviously be higher for vermiculite than for graphite.

An intumescent compound contributes to the insulating ability of the fire barrier material by increasing the total thickness upon exposure to heat, to the ability of the fire barrier material to absorb thermal energy during a fire, and to the ability of the fire barrier material to create a generally tight seal around construction elements. The fire barrier material of the present invention containing an intumescent compound is particularly suitable for use with a firestop clamping assembly which surrounds pipes and other types of through-penetrations in walls and ceilings. Such a fire stop assembly is described, for example, in U.S. Pat. No. 5,103,609 (Thoreson et al.), which is incorporated herein by reference and describes one or more pieces of a fire barrier felt wrapped around a pipe and held in place by a metal clamping assembly. When heated, for example, by exposure to flames or fire, the fire barrier material expands to fill gaps that may be created if the pipe collapses.

Endothermic Compounds

As used herein, an endothermic compound is one that absorbs heat, typically by releasing water of hydration, by going through a phase change that absorbs heat (i.e. liquid to gas), or by other chemical change where the reaction requires a net absorption of heat to take place (such as the release of $NH_3$ from $MgNH_4PO_4$).

Suitable endothermic compounds include compounds which thermally decompose, typically with the evolution of one or more small molecules such as ammonia, carbon dioxide, and/or water; which volatilize; or which react with one or more other compounds present within the fire barrier material or the surrounding atmosphere in a manner which provides a net uptake of thermal energy by the system. In cases involving small molecule evolution or substantial volatilization of a constituent of the endothermic material some heat may be carried away from the fire barrier material and the items to be protected by the fire barrier material. Solid endothermic compounds may provide separate contributions from each of heat of fusion, heat capacity, heat of vaporization, and thermal energy lost as hot gas leaves the fire barrier material. Preferably, any volatile gas produced by the endothermic compound is not combustible.

An endothermic compound of the present invention will typically contribute to the heat dissipation characteristics of a fire barrier material in accordance with the present invention by absorbing thermal energy and releasing gases (such as water vapor). Such gases often contribute to the effectiveness of the fire barrier material by transporting heat from the region protected by the fire barrier material. Preferably, the gases are released at a temperature below about 500° C.

Suitable endothermic compounds are those containing water molecules (i.e. water of hydration) for use in the present invention. Preferably, these compounds are in a form that is insoluble in water or only slightly soluble in water. That is, preferably they exhibit no more than about 5% solubility in water at about 25° C. and more preferably, no more than about 20% solubility in water at 50° C. As used herein all solubility percentages are weight percentages based on the weight of the material (fully hydrated if the molecules contain water of hydration) and the total weight of the solution.

Suitable endothermic compounds include inorganic material which provides endothermic reaction or phase change without exothermic decomposition or combustion between 90 and 1500° C. Exemplary compounds include alumina trihydrate (ATH) ($Al_2O_3 \cdot 3H_2O$), hydrated zinc borate ($ZnB_2O_4 \cdot 6H_2O$), calcium sulfate ($CaSO_4 \cdot 2H_2O$) also known as gypsum, magnesium ammonium phosphate ($MgNH_4PO_4 \cdot 6H_2O$), magnesium hydroxide ($Mg(OH)_2$). ZnB, and encapsulated $H_2O$.

Magnesium ammonium phosphate is preferred because it releases a significant amount of water of hydration below the temperature where most organic materials reach the activation point for combustion. This compound is available under the trade designation "Budit 370" from Cometals Inc. of New York, N.Y. Another preferred endothermic material is alumina trihydrate, such as that commercially available under the trade designation "SOLEM SB-36" from J. M. Huber Corp., Solem Div., Norcross, Ga. This latter material is available as a powder with 90% of the particles having a diameter of about 6 to 60 micrometers. Other preferred endothermic compounds include gypsum, $CaSO_4 \cdot 2H_2O$, which is commercially available from James Hardie Gypsum, Los Vegas, Nev. under the trade designation "Soultion Gypsum" and hydrated zinc borate, $2ZnO \cdot 3B_2O_3 \cdot 3.5H_2O$, which is commercially available from U.S Borax, Los Angeles, Calif. under the trade designation "Firebrake ZB".

In addition, the endothermic compounds of the invention may comprise an encapsulated, microencapsulated, or otherwise contained compound or solution. It is believed that such containment or encapsulation may contribute to the long term stability of the endothermic material prior to exposure to fire or other sources of heat or it may contribute to ease of fabrication of the article by controlling the degree of interaction between the encapsulated material and the remaining elements of the formulation or with materials which may be present transiently during processing. Examples of such encapsulated constituents include, but are not limited to, water-soluble salts, aqueous solutions, and water, preferably including a humectant to minimize water loss during storage and use prior to exposure to fire.

Endothermic compounds typically are present in an amount ranging from about 14.5 weight % to about 94.5 weight %, preferably 24.5 weight % to about 90.5 weight %, based on the total weight % of the fire barrier material.

Suitable endothermic compound, as part of the heat absorbing compounds of the present invention, are typically in the form of discrete particles. Endothermic particle shape, size, and density should be selected to avoid difficulties in dewatering of the fire barrier material and the need for additional binder to maintain structural integrity of the material. For example, excessively small particles may clog the dewatering screen during the process of making the fire barrier material in accordance with the process described below and have a large surface area requiring a large amount of binder. On the other hand, very large particles tend to disrupt the cohesive fiber//binder structure that forms when the binder, for example, in the form of a latex, is precipitated onto the dispersed heat absorbing compounds and fibers during the process of making a fire barrier material of the present invention as described below. Such an excess of very large particles contributes to crack propagation and lack of cohesive strength in the final article. The actual particle size limitations depend on the shape, density, and surface characteristics of the endothermic compound.

Optional Additives

Optional additives may be included to add or enhance properties of the fire barrier material and may include fillers, pigments, fire retardants, and processing aids.

When the binder does not have inherent flame retardant properties, it is desirable to add a flame retardant to the mixture of binder, intumescent, and organic fibers. Exemplary flame retardant compounds include phosphorous-containing compounds (e.g., ethylene diamine phosphate, magnesium ammonium phosphate, polymer-encapsulated ammonium polyphosphate, and organic phosphate oils), boron-containing compounds, alumina trihydrate, antimony oxide, and other metal oxides and hydrates.

Exemplary flame retardants are preferably insoluble organic phosphates, which may be added to the combustion load (i.e., exothermic contributions) during firing of the binder and fibers. As known to the art, less than 0.05 weight percent of functional phosphate to the total composition is necessary to accomplish this end. A preferred organic phosphate oil (e.g., a phosphate ester) is commercially available under the trade designation "SANTICIZER 141" from Monsanto of St. Louis, Mo. (containing 2.7–3.0 weight % phosphorous).

Suitable fire retardants include those which promote fluxing and fusing of the fire barrier material when exposed to a fire, for example, metals such as antimony and metal oxides. These materials enhance the strength of the fired sheet.

Fillers may be included to add reinforcement, adjust the stiffness, alter the handleability, or produce other desirable characteristics of the fire barrier material either before or after exposure to heat and flame. Exemplary fillers include fumed silica, clay, fly ash, perlite, vermiculite, glass powders or frits, sodium aluminates, zinc borate, and boric oxide. Some of these refractory materials (i.e., oxides, borates, and glass and ceramic materials) may contribute to the fire barrier or fire retardant properties of the fire barrier material; such are preferred fillers. Exemplary glass frit includes glass frit commercially available from CEEPREE Products Ltd., Southport, Merseyside, England, under the trade designation "Ceepree 200".

If a halogenated organic polymeric material is used as a binder, zinc oxide is typically added to scavenge HCl, which is given off if the fire barrier material is heated.

Pigments may be useful as an identification aid for the product. Exemplary pigments and colorants include iron oxides, titanium dioxide (e.g., rutile), carbon black, and synthetic organic pigments and dyes (e.g., FD&C Blue #1).

Other additives include antiseptic materials such as fungicides and bactericides.

Various mixtures and combinations of these additive materials may be used.

Suitable processing aids include surfactants such as defoaming agent. Defoamers may be used to minimize foaming at all steps and facilitate draining the water off the coagulated curd on a screen during the process described below. For example, a petroleum derivative commercially available from Henkle, Ambler, Pa., under the trade designation "FOAMMASTER II", may be added during the process. Ionic surfactants such as are commercially available from Rohm & Haas, Philadelphia, Pa. under the trade designation "TAMOL 850", may also be used in the coagulation and forming processes and are typically used to assist in creating a homogeneous dispersion and incorporation of materials into the coagulated curd. Inorganic buffering complexes, such as aluminum sulfates, may also be used to initiate and control coagulation of a binder, for example, in the form of a latex, and may be slightly residual in the final product.

Optional additives are present in amounts as would be understood by one skilled in the art. Generally, optional additives make up less than 1 weight % of total weight of the fire barrier material, although colorants and antiseptic materials might be included in larger amounts, for example, colorants may be included in an amount of up to about 10 weight % based on the total weight % of the fire barrier material.

Fire Barrier Material

A fire barrier material of the present invention has the capacity to absorb a significant magnitude of heat and prevent transfer of heat from a fire across the barrier for a significant period of time. In addition, a fire barrier material in accordance with the present invention is not a significant thermal insulator in the unfired state, allowing the dissipation of heat associated with the protected item, for example, a cable tray, while providing both an endothermic stage during firing to delay a rise in temperature and an expanded insulative state after firing to continue to delay fire spread passively and to seal any opening which could admit fire, heat, or corrosive gasses.

A fire barrier material in accordance with the present invention has a density of at least about 0.5 g/cc.

The high sheet densities resulting from a very high ratio, by weight, of inorganic heat absorbing compounds to fiber and binder are advantageous in increasing thermal conductivity and allowing good heat dissipation when wrapped around cables and electrical items, thus maintaining normal current capacity (ampacity) in the unfired state.

The fire barrier material of the present invention is dense enough in its unfired state to allow for dissipation of heat from the article protected by the material, for example, wires or pipes. In other words, the composition does not have a significant insulating effect at ambient temperatures (as compared with typical insulating materials such as mineral wool and intumescent felts) which is useful in applications such as electrical or mechanical installations where heat buildup during normal function is detrimental. Once subjected to a fire, the fire barrier material of the present invention expands increasing its insulative properties and additionally absorbing heat. The endothermic compound also absorbs heat further slowing the temperature rise. Ultimately, the fire barrier material swells to block openings; the inorganic component will fuse sufficiently to maintain the integrity of the fire barrier during the fire and the material will form a mechanically strong mass to seal any opening and remain lodged in place. The predominant presence of a heat absorptive materials makes the material of the present invention especially effective at preventing the movement of heat into the protected area or to the protected object.

The flexibility of the sheets formed in accordance with the invention depends on thickness and composition. With respect to thickness, for example, a 0.62 cm thick felt in the form of a mat can be easily wrapped around a pipe 5.08 cm in diameter without visible cracking or spalling. A thicker sheet, such as that in the form of a 1.25 cm thick mat, however, may exhibit some visible cracking or spalling when wrapped around a small diameter object, such as a 2.5 cm diameter pipe. Thus, a flexible sheet will retain its structural integrity after being bent or curved.

The fire barrier material typically does not contain more than 12 weight % of organic components or material, based on the total weight of the fire barrier material.

Fire barrier material may be in the form of various shapes, sizes, and thicknesses. When the fire barrier material is in the form of a sheet, typically the sheet has a thickness ranging from at least about 0.5 mm, preferably at least about 3 mm, depending on the end use application. Sheets of fire barrier material of the present invention may be secured or held in position around articles to be protected (conduits, cable trays, pipes, door frames, chemical tanks, isolation chambers, etc.) by being wrapped with a securing means resistant to high temperatures such as ceramic fiber cord or wire cloth. It is desirable to have the wrapping restrain the sheet, holding it tightly around the object expected to be exposed to open fire. A suitable ceramic cord can be made from the fiber described in U.S. Pat. Nos. 3,709,705; 3,795,524; and 4,047,965, incorporated herein by reference. A suitable ceramic fiber cord is commercially available from Minnesota Mining and Manufacturing Company (3M), St. Paul, Minn., under the trade designation "Nextel".

Method of Making a Fire Barrier Material

A method for making a fire barrier material of the present invention involves basic steps of a conventional papermaking process, differing by some additional process considerations described below and in the particular components of the present invention.

Generally, a material in accordance with the present invention may be made by mixing the ingredients together with water to form a turbulent suspension. A binder, for example, in the form of a latex, is dispersively coagulated over the particulates and fibers in the suspension, and the resulting curd, maintained in suspension by turbulent mixing. The suspended curd flows to a headbox and from there onto a draining screen, for example, a Fourdrinier wire screen, to allow for removal of water, i.e., dewatering. The dewatered curds are drained and knit together to yield a homogeneous mass in which the fibers and heat absorbing compounds are bound together by the polymer. Larger curds promote improved drainage and are preferred for making thicker sheets. The size of the curd can be controlled by balancing the shear velocity of the water suspension, the temperature of the suspension, and the degree of pH shock or ionic disruption during precipitation of the polymer. Particular exemplary steps of this process will now be discussed.

A polymeric binder, for example, in the form of a latex, is mixed with heat absorbing compounds, comprising an intumescent compound and an endothermic compound, and a surfactant to form a homogeneous suspension, referred to herein as a "premix". This premix can also contain other desired additives, but does not typically contain fibers, such as the organic or inorganic fibers described above, at this stage. The premix is then combined with fibers. It is desirable to individualize the fibers before combining them with the premix by subjecting them to shear forces, for example, by mixing the fibers in a blender or otherwise, suspending the fibers in water using turbulent shear, for example, by adding the fibers in a large tank with a high speed mixing blade with a large volume of water to form a "fiber slush". A basic salt, for example, sodium aluminate, may be added to the fiber slush to provide a high pH, buffered solution having a pH typically ranging from about 8 to 10. The sodium aluminate is washed away during the dewatering process and typically does not contribute to the final weight of the composition.

The premix is then poured or pumped into a container holding the fiber slush. In the present invention, certain preferred processing conditions have been developed. Preferably, the mixing of the premix with the fiber slush is done at a controlled temperature in preparation for the precipitation step, for example, at about 45 to 55° C. or greater. In addition, the mixture is stirred continuously in order to maintain homogeneous mixed suspension. When the fiber slush and premix containing the polymer are mixed together, the mixture is at a basic pH, typically within a range of about 8 to 10. The suspension is then acidified using an acidic salt, for example, sodium aluminate, to a pH preferably ranging from 2.5 to 4.5. A pH change is preferably used to coagulate or precipitate the suspension; however, other methods as known and used in the paper industry or other known methods, for example heat shock, or ionic disruption of the colloidal boundaries, of disrupting the colloidal structure of the latex are available to coagulate or precipitate the suspension.

While not wanting to be bound by any particular theory, it is believed that acidification causes coagulation of the polymer in the binder onto the heat absorbing compounds and fibers in the suspension by disrupting the ionic balance at the surface of the polymer lattices. This disruption and subsequent coagulation or precipitation onto the particulate and fiber component causes the formation curds of a highly homogeneous composite that can be formed into a suitable material of the present invention by vacuuming away the water portion of the suspension.

The change in pH must be sufficient to rapidly disrupt the colloidal structure of the latex causing it to rapidly drop out of suspension onto neighboring particles and fibers. Rapid addition of acidic salts at the initiation of precipitation and corresponding rapid change in pH will also encourage more homogeneous distribution of particles, fibers, and binder in the forming curd.

Using a high temperature, for example, in excess of 45° C., and a strong pH change in the environment of the turbulent suspension is generally preferred for homogeneously distributing the binder, for example, supplied in latex form, across the surface area of the fibers and the heat absorbing compounds, creating a dense curd. This macroscopically homogeneous composite structure with highly dispersed fiber allows the incorporation of a high percentage of heat absorbing compounds in accordance with the present invention to produce a material with an endothermic content of magnitude great enough to be useful as heat dissipater in the design of fire barrier systems.

During the precipitation step higher temperatures will encourage the binder to distribute efficiently over the particulates and fiber in the suspension rather than coagulate on itself forming discrete particles of binder. High turbulent shear encourages the same effect.

The temperature, the shear forces, and the amount and speed of pH change are selected to avoid suspended inorganic particulate that has not been incorporated into the curd, small particles of coagulated polymer, and loose fibrous masses typical of conventional papermaking. Such suspensions will be difficult to dewater and form, often plugging the drainage screen with sticky binder particles and retaining water in a sponge like fashion. Instead these process conditions will be selected to have good cohesive strength, to allow the end material to be lifted from the dewatering screen, and sufficient cohesive strength in the final article to render it useful.

It is desired to maintain the particles of heat absorbing compounds in suspension during the process. Larger, dense particles of heat absorbing compounds, however, tend to cause settling during manufacturing, as well as disrupt the strength of the fiber/heat absorbing compounds/polymer matrix. If larger particles are used, for example, as with the case of some intumescent compounds, and it is difficult to incorporate them into the precipitated curd because they may settle, one possible method is to meter the larger particles into the curd as it flows through a headbox, under turbulent conditions, which feeds to a draining screen in a standard papermaking line to provide for a steady state condition before the material is deposited on the draining screen.

A defoamer can be added at any point during the process at which it appears necessary to reduce the amount of foaming. Suitable defoamers include petroleum derivatives such as "FOAMMASTER II" from Henkel of Ambler, Pa.

The fire barrier material intermediate from the draining screen, for example, a Fourdrinier screen, may be further densified by calendering and then dried by suitable methods, for example, using a drier such as heated rolls, for example, a steam drum drier, hot air impingement, infrared radiation, or an oven. The web temperature is typically kept below the decomposition temperature of the endothermic compounds, for example, a hydrate, or the onset of intumescence, preferably below 110° C. The fire barrier material can be formed into a desired shape having desired dimensions including thickness. Various useful shapes include shells, honeycombs, and sheets such as corrugated sheets. Formation into a shape can be accomplished by using well know techniques such as vacuum forming process or otherwise draining the curd and molding it into shapes using heat and pressure. For example, the curd can be vacuum formed by known methods using a three-dimensional screen. In such processes, a manifold connected to a vacuum is positioned within the screen form to pull the supernatant liquid to and through the form, leaving a layer of knitted coagulum layered on the outside of the form. A material formed in this fashion can be densified and further shaped by compression between mating mold elements if desired, dried, and further finished.

Formation into a sheet can be accomplished by well known techniques including a papermaking process. For example, to make a sheet of fire barrier material, the highly homogenous curd composite may be cast onto a papermaking screen, such as a Fourdrinier screen, drained to remove excess water, pressed to remove as much water as possible and increase the density and cohesiveness of the sheet, and then dried. It may be desirable during the casting process to add additional defoaming agent; this is typically done by spraying some of the defoaming agent on the sheet as it is forming, just before dewatering, i.e., water is removed.

An alternative embodiment of this invention involves adding a backing to the fire barrier material. A suitable backing material is aluminum foil having a thickness of about 0.08 mm and having a pressure sensitive adhesive coated on one side. The backing is adhered to the fire barrier material by means of the adhesive. Such backing may provide an added degree of thermal resistance to the fire barrier material, may improve the durability of the material when exposed to weathering, and may improve cohesiveness when the material is used to wrap around sharp corners or articles with very small radii.

It is difficult, if not impossible, to obtain this highly dispersed composite material of the present invention by methods employed in standard coating and extrusion techniques typically taught and employed in making conventional fire barrier materials when using component/compound amounts in accordance with the present invention.

EXAMPLES

This invention will be further illustrated by the following examples, which are intended to be purely exemplary. Two tests have been used to evaluate materials representative of the present invention as described below with reference to NFPA80 "Standard for Fire Doors and Fire Windows" Uniform Building Code 7.2, and ASTM E119-95a "Fire Tests of Building Construction and Materials"/ASTM E814-94b "Fire Tests of Through Penetration Fire Stops", which are all standard fire tests for building and construction materials. In addition, the material of the present invention was tested according to the Thickness Expansion Test described below.

Plastic Pipe Penetration Fire Test

The test was conducted as described in ASTM E814-94b "Fire Tests of Through Penetration Fire Stops and E119-95a "Fire Tests of Building Construction and Materials" and with the following details noted herein. A 4.5" thick cement slab typical of a two hour fire rated floor was poured and cured, and circular holes of the indicated size were bored in it. A plastic pipe of the indicated size was centered in the hole with at least two feet (30.48 cm) of pipe penetrating through the underside of the slab. The bottom end of the pipe was capped with a plastic cap of the same plastic material as the pipe. The pipe was attached to a metal frame on the upper side to hold it in position. The slab, with pipes attached, was positioned on top of a 2.72 cubic meter floor furnace built to ASTM E814 and E119 specifications.

In all cases, a bead of caulk commercially available from Minnesota Mining and Manufacturing Company (3M), St. Paul, Minn. under the trade designation "Fire Barrier WB+

Caulk" or putty commercially available from Minnesota Mining and Manufacturing Company (3M), St. Paul, Minn. under the trade designation "Fire Barrier Moldable Putty" was placed in the opening between the pipe and the cement at the underside of the slab in an amount to seal the opening from air movement and provide the code-required smoke seal for the system before the fire barrier sheet was activated.

The fire barrier sheet material was cut into two inch (5.08 cm) wide strips and wrapped continuously around the pipe to achieve the number of layers indicted. A piece of strapping tape was used to temporarily fasten the end of the strip. A collar commercially available from Minnesota Mining and Manufacturing Company (3M), St. Paul, Minn. under the trade designation "Fire Barrier RC1" was fastened over the top of the wrapped configuration and tightly fastened with a hose clamp. Thermocouples were placed in the top of the pipe, one inch (2.54 cm) above the cement on the outside of the pipe, and on the cement slab as described in ASTM E814 and ASTM E119. The temperature readings on these thermocouples were used to determine if the system exceeded the temperature set forth in ASTM E814 and ASTM E119. After the slab was removed from the furnace, it is hit on the hot (furnace) side with a stream of water of a pressure and volume defined in ASTM E814 and ASTM E119 (called the Hose Stream Test). A three hour rating means that the thermocouple readings remained below the temperature limits for three hours, and that, when the system was removed from the fire, no water was evident on the cold (unburned) side of the system after the Hose Stream Test.

Window and Door Seal Fire Test

A two hour rated gyp-wall assembly with a typical door and frame assembly from Grahm Industries, Mason, Iowa, having Part No. WH1-069915, which were sufficiently engineered to pass the NFPA80 "Standard for Fire Doors and Fire Windows" Uniform Building Code 7, were installed in the front of a typical wall furnace built to specifications detailed in NFPA80 "Standard for Fire Doors and Fire Windows" Uniform Building Code 7-2. The test was run with temperatures, pressures and all other details as described in NFPA80 "Standard for Fire Doors and Fire Windows" Uniform Building Code 7-2 for 90 minutes.

The two sides and the top of the frame surrounding door has a one inch (2.54 cm) wide and ⅛ inch (3.2 mm) thick strip of a sheet comprising fire barrier material of the present invention friction fit between the edge of the door and the frame and between the hinge plates. The material was centered on the edge of the door. The door is closed and latched in the normal fashion during this test. The fire barrier material was not fitted at the bottom of the door because there is a negative pressure gradient at that position and heat does move towards the unburned side of the system against that pressure. The criterion for failure is visible flame on the cold (unburned) side of the door and frame assembly.

Thickness Expansion Test

A 2.54 cm diameter by 0.3 to 0.7 cm thick disk of the sheet was punched out using a pre-made die. An expansion test was done to measure the expansion coefficient in one direction (that is, thickness) since 90% of the expansion of these materials occurs in a direction normal to their surface, wherein the expansion coefficient is equal to the thickness of the fired disk divided by the thickness of the initial disk. The expansion test was performed by (1) measuring and recording the thickness of the disk prior to firing, (2) firing the disk in an electric still air oven or kiln at 350° C. for 10 minutes, and (3) then measuring and recording the thickness of the disk after it has freely and completely expanded. The "expansion coefficient" is equal to the measurement recorded in (2) divided by the measurement recorded in (1).

Example 1

Samples of Example 1 were prepared by the following method. A premix was made by blending together, in a low shear mogul blender, 42.8 pounds of an acrylate latex (55% solids, a terpolymer of ethylene-vinyl acetate-acrylate commercially available under the trade designation "AIRFLEX 600BP" from Air Products and Chemicals, Inc., Allentown, Pa.), 9.7 pounds (4.4 kilograms) of an organic phosphate ester commercially available under the trade designation "SANTICIZER 141" from Monsanto Chemical Co., St. Louis, Mo.), 1.17 pounds (0.53 kilograms) of a surfactant (a sodium salt of polymeric carboxylic acid (30% active in solution) commercially available under the trade designation "TAMOL 850" from Rohm & Haas, Philadelphia, Pa.), 146 pounds (66.2 kilograms) of aluminum trihydrate (commercially available under the trade designation "SOLEM SB36" from Solem Manufacturing, J. J. Huber Corp., Fairmount, Ga.), and about 11 gallons (41.6 liters) of deionized water to thin the mixture. The mixture was blended until all ingredients were completely dispersed and the mixture was smooth. This premix was then held until it was needed to be pumped into another container holding a slush of fibers.

A high shear, larger capacity blender was charged with 960 gallons (3634 liters) of water which had been heated to a temperature of 45–55° C., 0.5 pounds (0.23 kilograms) of 32% sodium aluminate $Na_3Al_2O4$) aqueous solution (commercially available under the trade designation "NALCO 2372" from Nalco Chemical Co., Naperville, Ill.), 9.7 pounds (4.4 kilograms) of fiberglass (a glass fiber commercially available under the trade designation "MICROFIBER 106/475" from Shuller International, Defiance, Ohio.). The fibers were mixed in the blender for about 2.5 minutes. While this was mixing, 9.7 pounds (4.4 kilograms) of 0.25 inch (6.35 mm) long, 1.5 denier rayon fiber commercially available from MiniFiber, Inc. of Johnson City, Tenn. under the trade designation "RAYON 3D¼"" was sprinkled into the mixing tank. An additional 250 gallons (946 liters) of water was used to rinse this mixture out of the blender while transferring it to a larger tank with a low speed mixing blade.

The suspension containing the fibers and the premix containing the binder and other ingredients (in the form of a binder complex) were both pumped into this larger tank equipped with a low speed mixing blade. The mixture was continually mixed to prevent settling. The temperature of the stirring mixture was held at about 50° C.(±5° C.). 365 pounds (165.6 kilograms) of intumescent intercalated graphite (a sulfuric acid treated graphite flake with a pH neutralized surface commercially available under the trade designation "GRAPHITE TG373" from UCAR Carbon Co., Danbury, Conn.) was then added slowly to the mixture while stirring until completely dispersed. About 58 pounds (26.3 kilograms) of a 25 weight % solution of aluminum sulfate $(Al_2(SO_4)_3 0.14H_2O)$ (commercially available under the trade designation "NALCO 7530" from Nalco Chemical Co., Naperville, Ill.) was added to the diluted mixture with stirring. The coagulated curd was left to stir for about 1 hour to allow the curd to stabilize.

The mixture was cast into sheets using a conventional Fourdrinier paper making machine employing a steam drum drier. To minimize foaming during casting into sheets, about 25 mL of a defoaming agent (a petroleum derivative commercially available under the trade designation "FOAM-MASTER II" from Henkle, Ambler, Pa.) was added to the mixture from a spray bottle. The cast material had a weight per unit area of about 40–60 grams per 24 square inches (154.8 sq. cm) and a thickness ranging around ⅛ inch (3.2 mm).

The resulting fire barrier material was used in a series of two hour Through Penetration Fire Tests in accordance with ASTM E814-94b "Fire Tests of Through Penetration Fire Stops" described in the section "Plastic Pipe Penetration Fire Tests involving plastic pipes of various sizes set forth in Table 1. In this test, a two inch (5.08 cm) wide strip of the fire barrier material was wrapped continuously around the pipe abutting the surface of the cement slab. The wrap was temporarily secured with a piece of masking tape and a steel collar commercially available from Minnesota Mining and Manufacturing Company (3M), St. Paul, Minn. under the trade designation "RC-1". The RC-1 plastic pipe collar was secured around the fire barrier material with a hose clamp and the tabs were bent in. All tests were run with both polypropylene schedule 40 pipe and polyvinylchloride schedule 40 pipe.

Five samples of Example 1 were tested and passed the ASTM E814 Flame, T-rating, and Hose Stream Criteria at a three hour rating.

TABLE 1

| Sample No. | Pipe Size (inches) [cm] | Hole Size (inches) [cm] | Number of Wraps | Result |
|---|---|---|---|---|
| 1 | 6 [15.24] | 7 [17.78] | 6 | 3 hour rating |
| 2 | 4 [10.16] | 5 [12.7] | 4 | 3 hour rating |
| 3 | 3 [7.62] | 4 [10.16] | 3 | 3 hour rating |
| 4 | 2 [5.08] | 3 [7.62] | 2 | 3 hour rating |
| 5 | 1.5 [3.81] | 2.5 [6.35] | 2 | 3 hour rating |

In addition, several samples of Example 1 were cut into 2.5 cm diameter coupons and tested according to the Thickness Expansion Test. The expansion coefficient ranged from 15 to 25.

Example 2

Samples of Example 2 were prepared by the following method. A premix was prepared by mixing, by hand in a large beaker, 16 grams of an acrylate latex (55% solids, a terpolymer of ethylene-vinyl acetate-acrylate commercially available under the trade designation "AIRFLEX 600BP" from Air Products and Chemicals, Inc., Allentown, Pa.), 3 grams of an organic phosphate ester commercially available under the trade designation "SANTICIZER 141" from Monsanto Chemical Co., St. Louis, Mo.), and 0.24 grams of a surfactant (a sodium salt of polymeric carboxylic acid (30% active in solution) commercially available under the trade designation "TAMOL 850" from Rohm & Haas, Philadelphia, Pa.) until homogenous. About 100 ml of deionized water, 10 grams of intumescent intercalated graphite (a sulfuric acid treated graphite flake with a pH neutralized surface commercially available under the trade designation "GRAPHITE TG373" from UCAR Carbon Co., Danbury, Conn.), and 80 grams of aluminum trihydrate (commercially available under the trade designation "SOLEM SB36", Solem Manufacturing, J. J. Huber Corp., Fairmount, Ga.) were added and mixed in by hand until smooth and pourable.

A fiber slush was prepared by combining 5 grams of a glass fiber commercially available from Shuller International, Defiance, Ohio under the trade designation "MICROFIBER 475/106" and 3 grams of 0.25 inch long (0.63 cm), 1.5 denier rayon flocking tow commercially available from MiniFiber, Inc. of Johnson City, Tenn. under the trade designation "Rayon 3D¼"", with 2 liters of 50° C. deionized water in a blender and mixing at high speed for 6 seconds to individualize the fibers. The fiber slush was poured into a 5 liter beaker. Agitation, to prevent settling, was provided by a stirring rod powered by a pneumatic motor. The mixture containing the latex and heat absorptive compounds was poured into this fiber slush and 3 drops of a defoamer commercially available from Henkle, Ambler, Pa. under the trade designation "FOAMMASTER II" was added. Over a period of 2 minutes, 20 grams of 25 weight % aluminum sulfate solution commercially available from Nalco Chemical Co. of Naperville, Ill. under the trade designation "NALCO 7530" was poured into this mixture. The agitation was continued for another 5 minutes to allow the coagulated curd to increase in density. The mixture was transferred to a 20.3 cm×20.3 cm papermaker (commercially available from Williams Apparatus Co., Watertown, N.Y. under the trade designation "Handsheet Maker") and drained to remove the excess water. The resultant soft sheet was then pressed with blotter paper at 420 Pascals to further remove water and increase the structural density and cohesiveness. The sheet was then dried in a lab oven at 128° C. The sheet measured approximately ⅛ inch (0.63 cm) thick.

A sample of Example 2 was cut into three 2.5 cm diameter coupons which were tested for expansion in accordance with the Thickness Expansion Test. The average expansion coefficient for the three coupons was 4.

In addition, a sample of Example 2 was cut into a one inch (2.54 cm) wide strips to install as a fire seal on a door and run a fire test described in Window and Door Fire Test above. The seal composed of this material received a rating on this test of 90 minutes. No flame was observed on the unburned side of the door during this time. The sheet remained intact through the test and retained its flexible nature.

This material provided an excellent barrier to heat flow during the fire with a minimum volume in a limited space due to its density and high content of active ingredients. The 90 minute rating in the door test using this material is an important result, especially with retrofit for existing doors installed in buildings covered under new code language.

Examples 3 to 13

Examples 3 to 13 were prepared in the same manner as Example 2 with the components set forth in Tables 2A and 2B. Samples of these Examples were tested according to the Thickness Expansion Test and the results are set forth in Table 3.

TABLE 2A

| | Example Nos. | | | | |
|---|---|---|---|---|---|
| Components (grams) | 3 | 4 | 5 | 6 | 7 |
| "AIRFLEX 600BP" | 8.8 | 8.8 | 8.8 | 8.8 | 8.8 |
| "NEOPRENE 835"[1] | | | | | |
| "SANTICIZER 141" | 3 | 3 | 3 | 3 | 3 |
| "TAMOL 850" | 0.24 | 0.24 | 0.24 | 0.24 | 0.24 |
| Gypsum[2] | | | | | |
| MgNH$_4$PO$_4$[3] | | | | | |
| "EXPANTROL 4BW"[5] | | | | 15 | 15 |
| "GRAPHITE TG373" | 25 | 25 | 15 | | 15 |
| "SOLEM SB 36" | 70 | 70 | 70 | 70 | 70 |

TABLE 2A-continued

| Components (grams) | Example Nos. | | | | |
|---|---|---|---|---|---|
| | 3 | 4 | 5 | 6 | 7 |
| "MICROFIBER 475/106" | 1.25 | 5 | 1.25 | 1.25 | 5 |
| "FIBERFRAX 7000M"[6] | 11.25 | | 11.25 | 11.25 | |
| "RAYON 3D 1/4" | 1.25 | 3 | 1.25 | | 3 |
| "NALCO 2372"[7] | | | | 0.4 | |
| "NALCO 7530" | 12 | 12 | 12 | 12 | 12 |
| "FOAMMASTER II"* | 0.1 | 0.1 | 0.1 | 0.1 | 0.1 |

TABLE 2B

| Components (grams) | Example Nos. | | | | | |
|---|---|---|---|---|---|---|
| | 8 | 9 | 10 | 11 | 12 | 13 |
| "AIRFLEX 600BP" | 8.8 | 8.8 | 8.8 | | 11 | 8.8 |
| "NEOPRENE 835"[1] | | | | 8.8 | | |
| "SANTICIZER 141" | 3 | 3 | 3 | | 3 | 3 |
| "TAMOL 850" | 0.24 | 0.24 | 0.24 | | 0.24 | 0.24 |
| Gypsum[2] | | | | | | 70 |
| MgNH$_4$PO$_4$[3] | | | | | 70 | |
| "EXPANTROL 4BW"[5] | 15 | 30 | 25 | 30 | | |
| "GRAPHITE TG373" | | | 20 | | 25 | 25 |
| "SOLEM SB 36" | 70 | 70 | 70 | 80 | | |
| "MICROFIBER 475/106" | 5 | 5 | 5 | 5 | 1.25 | 5 |
| "FIBERFRAX 7000M"[6] | | | | | 11.25 | |
| "RAYON 3D 1/4" | 3 | 3 | 3 | 3 | 1.25 | 3 |
| "NALCO 2372"[7] | | | | | | |
| "NALCO 7530" | 20 | 20 | 20 | 20 | 15 | 15 |
| "FOAMMASTER II"* | 0.1 | 0.1 | 0.1 | 0.1 | 0.1 | 0.1 |

[1] a chloroprene binder commercially available from E.I. duPont de Nemours, Wilmington, DE under the trade designation "NEOPRENE 835"
[2] Gypsum is commercially available from James Hardie Gysum, Las Vegas, NV, under the trade designation "SOULTION GYPSUM".
[3] MgNH$_4$PO$_4$ is commercially available from Cometals Inc., New York, NY, under the trade designation "BUDIT 370".
[4] A granular hydrated alkali metal silicate intumescent compound commercially available from Minnesota Mining and Manufacturing Company (3M), St. Paul, MN, under the trade designation "EXPANTROL 4BW"
[5] Refractory aluminum silicate fibers commercially available from Carborundum, Niagra Falls, NY, under the trade designation "FIBER-FRAX 7000M"
[6] 25% of alum commercially available from Nalco Chemical Company, Naperville, IL under the trade designation "NALCO 2372"
*amount ranged from approximately 0.05–0.1 in order to eliminate foaming

TABLE 3

| Example | Vertical Expansion |
|---|---|
| 3 | 11.7 |
| 4 | 10.0 |
| 5 | 5.7 |
| 6 | 1.7 |
| 7 | 7.7 |
| 8 | 2.0 |
| 9 | 2.3 |
| 10 | 10.0 |
| 11 | 3.0 |
| 12 | 11.7 |
| 13 | 20.0 |

Although the preferred embodiments of the invention have been discussed and described in detail, it will be appreciated that changes and modifications to the described embodiments can be made by those skilled in the art without departing from the true spirit and scope of the invention, as set forth in the claims.

What is claimed is:

1. A flexible self-supporting fire barrier material comprising about 0.5 to about 25 weight % of a structural phase and greater than or equal to about 75 weight % to about 99.5 of inorganic heat absorbing compounds dispersed throughout the structural phase, based on a total weight % of the fire barrier material;

the structural phase comprising 0.5 to about 10 weight % binder and 0.01 to about 15 weight % fibers, based on the total weight % of the fire barrier material;

the inorganic heat absorbing compounds comprising an intumescent compound and an endothermic compound;

the material having a density of at least about 0.5 g/cc.

2. The flexible self-supporting fire barrier material of claim 1 wherein the structural phase comprises 3 weight % to less than about 9 weight % binder, based on the total weight % of the fire barrier material.

3. The flexible self-supporting fire barrier material of claim 1 wherein the structural phase comprises 3 weight % to less than about 10 weight % fibers, based on the total weight % of the fire barrier material.

4. The flexible self-supporting fire barrier material of claim 1 wherein the binder comprises a polymer selected from the group consisting of acrylate polymers, natural rubbers, polychloroprene, styrene butadiene copolymers, butadiene acrylonitrile copolymers, polyisoprene, polybutadiene, polyvinyl chloride, polyvinyl acetate, polyethylene terephthalate, polyethylene, polypropylene, polystyrene, and combinations and mixtures thereof.

5. The flexible self-supporting fire barrier material of claim 1 wherein the binder is in the form of a latex.

6. The flexible self-supporting fire barrier material of claim 5 wherein the latex comprises a polymer selected from the group consisting of acrylate and methacrylate polymers and copolymers, polybutadiene and polybutadiene acrylate, natural rubbers, styrene butadiene copolymers, butadiene acrylonitrile copolymers, urethane elastomers, polyvinylidene fluoride, polyamide, polyisoprene, polychloroprene, and polybutadiene.

7. The flexible self-supporting fire barrier material of claim 1 wherein the fibers comprise organic fibers, inorganic fibers, and combinations thereof.

8. The flexible self-supporting fire barrier material of claim 7 wherein the organic fibers comprise cellulosic fibers, synthetic polymeric fibers, or thermoplastic fibers.

9. The flexible self-supporting fire barrier material of claim 7 wherein the inorganic fibers comprises glass fibers, glass ceramic fibers, ceramic fibers, mineral fibers, metal fibers, or carbon fibers.

10. The flexible self-supporting fire barrier material of claim 7 wherein the fibers comprise a combination of aluminosilicate refractory fibers and fiberglass.

11. The flexible self-supporting fire barrier material of claim 7 wherein the organic fibers have a diameter of about 1 to 20 microns and an average length ranging from about 3 to about 25 mm.

12. The flexible self-supporting fire barrier material of claim 7 wherein the inorganic fibers have a diameter of about 0.05 to about 5 microns, preferably from 0.1 to 1 micron and an average length ranging from about 1 to about 25 mm.

13. The flexible self-supporting fire barrier material of claim 1 wherein the intumescent compound is an acid intercalated graphite having an acid-neutralized surface.

14. The flexible self-supporting fire barrier material of claim 1 wherein the intumescent compound is a granular hydrated alkali metal silicate.

15. The flexible self-supporting fire barrier material of claim 1 wherein the intumescent compound is present in an amount ranging from about 5 weight % to about 85 weight %, based on the total weight % of the fire barrier material.

16. The flexible self-supporting fire barrier material of claim 1 wherein the endothermic compound comprises alumina trihydrate, hydrated zinc borate, calcium sulfate, magnesium ammonium phosphate, magnesium hydroxide, ZnB, or encapsulated $H_2O$.

17. The flexible self-supporting fire barrier material of claim 1 wherein the endothermic compound is present in an amount ranging from about 14.5 weight % to about 94.5 weight %, based on the total weight % of the fire barrier material.

* * * * *